US008681648B2

(12) United States Patent
Famolari et al.

(10) Patent No.: US 8,681,648 B2
(45) Date of Patent: Mar. 25, 2014

(54) MOBILITY POLICY UPDATES FOR MOBILE DEVICES

(75) Inventors: David Famolari, Stewartsville, NJ (US); Subir Das, Belle Mead, NJ (US); Yoshihiro Ohba, Kawasaki (JP)

(73) Assignees: Telcordia Technologies, Inc., Piscataway, NJ (US); Kabushiki Kaisha Toshiba, Tokyo (JP)

( * ) Notice: Subject to any disclaimer, the term of this patent is extended or adjusted under 35 U.S.C. 154(b) by 216 days.

(21) Appl. No.: 13/069,881

(22) Filed: Mar. 23, 2011

(65) Prior Publication Data

US 2012/0069749 A1    Mar. 22, 2012

Related U.S. Application Data

(60) Provisional application No. 61/317,021, filed on Mar. 24, 2010.

(51) Int. Cl.
*H04W 24/00* (2009.01)
*H04W 8/00* (2009.01)

(52) U.S. Cl.
USPC .......................................... 370/252; 370/230.1

(58) Field of Classification Search
USPC ................ 370/230.1, 252, 235, 238
See application file for complete search history.

(56) References Cited

U.S. PATENT DOCUMENTS

| | | | |
|---|---|---|---|
| 2004/0249927 A1 | 12/2004 | Pezutti | |
| 2006/0140150 A1* | 6/2006 | Olvera-Hernandez et al. | 370/331 |
| 2006/0233101 A1 | 10/2006 | Luft et al. | |
| 2008/0032729 A1* | 2/2008 | Luo | 455/518 |
| 2008/0066150 A1 | 3/2008 | Lim | |
| 2009/0013318 A1 | 1/2009 | Aderton et al. | |
| 2009/0216867 A1* | 8/2009 | Pusateri et al. | 709/222 |
| 2009/0328219 A1 | 12/2009 | Narayanaswamy | |
| 2010/0174770 A1* | 7/2010 | Pandya | 709/200 |
| 2011/0131307 A1* | 6/2011 | El Bazzal et al. | 709/223 |

OTHER PUBLICATIONS

Patent Cooperation Treaty International Search Report, May 16, 2011.

* cited by examiner

*Primary Examiner* — Brian D Nguyen
(74) *Attorney, Agent, or Firm* — Philip J. Feig

(57) ABSTRACT

A packet data network gateway device may receive packet network data at a packet data network gateway device; filter the received packet network data to extract information associated with one or more messages in the packet network data; analyze the extracted information; and dynamically determine one or more of policy updates, rules, or thresholds based on the analyzing of the information and information associated with one or more of subscribers, location, existing policies, network operating condition and load.

23 Claims, 5 Drawing Sheets

MOBILITY POLICY UPDATES FOR MOBILE DEVICES

CROSS-REFERENCE TO RELATED APPLICATIONS

This application claims the benefit of U.S. Provisional Application No. 61/317,021, filed on Mar. 24, 2010, which is incorporated by reference herein in its entirety.

FIELD OF THE INVENTION

The present disclosure generally relates to mobile networking, and more particularly, to network discovery and selection.

BACKGROUND

The 3rd Generation Partnership Project (3GPP) specification establishes standards among telecommunications associations for third-generation (3G) mobile phone system specification. 3GPP standardization TR 23.861 specifies Multi access packet data network (PDN) connectivity and internet protocol (IP) flow mobility, including multi-interface user equipments (UEs), simultaneously connecting to 3GPP access and only one non-3GPP access, scenarios, requirements and solutions for dynamic routing of flows and provisioning of UEs to support routing/connectivity policies managed by the same PDN. However, TR 23.861 does not specify that the same IP flow is delivered over multiple accesses simultaneously or multiple PDNs are involved in the process. 3GPP standardization TS 23.402 provides for architecture enhancements for non-3GPP access and discusses inter-system mobility policies.

The existing methods implemented according to the 3GPP standards are static and not responsive to dynamic changes in network conditions, operator goals and changes in the networking environment. For example, the current practices rely on a static list of policies. User equipments are typically configured statically by an operator and are not enabled to respond to dynamically changing conditions of the network. Currently existing methodologies also do not focus on the intelligent and automated decision making needed to influence multi-radio behavior, and instead focuses on creating a set of "good enough" static policies.

BRIEF SUMMARY

A method and system for provisioning mobility policy updates for mobile devices may be provided. The method, in one aspect, may include receiving packet network data at a packet data network gateway device and classifying the received packet network data to extract information associated with one or more messages in the packet network data. The method may also include analyzing the information to determine current operating conditions of a network. The method may further include dynamically determining one or more of policy updates, rules, or thresholds based on the analyzing of the information and information associated with subscribers, location, existing policies, and network operating condition and load.

A system for provisioning mobility policy updates for mobile devices, in one aspect, may include a packet network gateway device receiving packet network data and serving as an entry and exit point for the packet network data from one or more user equipments. A filter module resident in the packet network gateway device may be operable to receive a flow of the network data and classify the network data to extract information associated with one or more messages in the packet network data. A compare module resident in the packet network gateway device may be operable to analyze the information. A decision logic module resident in the packet network gateway device may be operable to determine one or more of policy updates, rules, or thresholds based on the analyzing of the extracted information and information associated with subscribers, existing policies, and network load.

Further features as well as the structure and operation of various embodiments are described in detail below with reference to the accompanying drawings. In the drawings, like reference numbers indicate identical or functionally similar elements.

DETAILED DESCRIPTION

The present disclosure in one embodiment addresses the problem of multi-radio devices connecting to the most appropriate network at the most appropriate time, based on both local conditions as seen by the device as well as global condition as seen by the network. In one embodiment of the present disclosure, methodologies may be provided that deliver intelligent policy updates to multi-radio devices enabling operators to dynamically influence network attach decisions and optimize network performance access network types.

The methodologies of the present disclosure in one embodiment may work by delivering inter-system mobility (ISM) policy information to mobile radio devices that prompts the device to make one of a set of pre-provisioned policies dominant. In one embodiment of the present disclosure, when a network attach decision is required, a mobile device may be enabled to consult the most dominant ISM policy. The methodologies of the present disclosure in one embodiment may enable network operators to deliver new policy settings to mobile devices in response to changing network conditions, operator objectives, service conditions and a host of other stimuli. The methodologies of the present disclosure may also increase responsiveness to emergent conditions, greater control and granularity of policy updates and the ability to influence both an individual as well as a group of individual mobile devices.

The methodologies of the present disclosure in one embodiment may be implemented in network equipment. In another aspect, the methodologies of the present disclosure may also be implemented in carrier technologies, for instance, to control traffic and network attach decisions within the carrier's networks.

Figure 1:
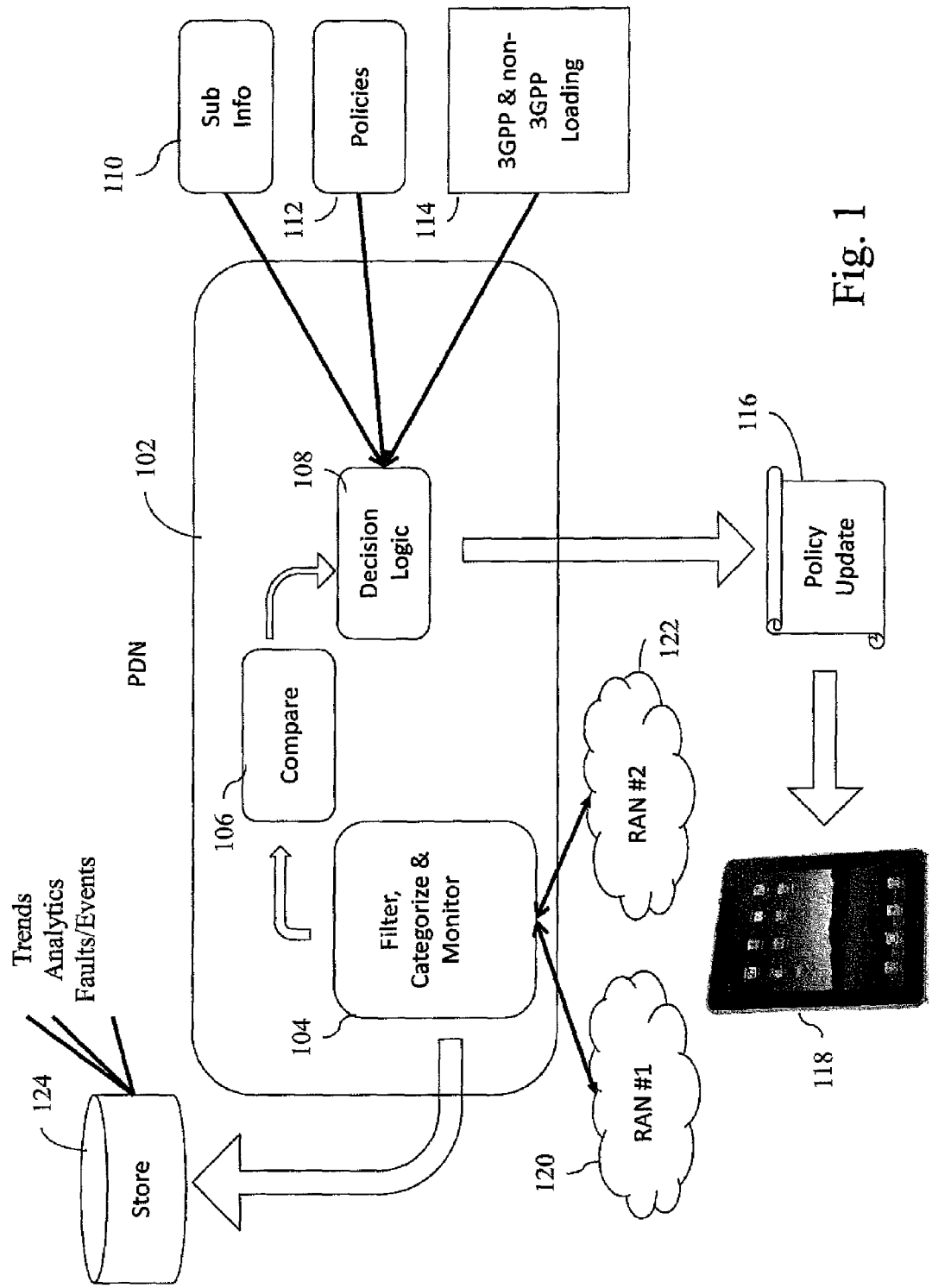
FIG. 1 is a diagram illustrating functional elements that support adaptive policy frameworks of the present disclosure in one embodiment.

FIG. 1 is a diagram illustrating functional elements that support adaptive policy frameworks of the present disclosure in one embodiment. In one aspect, IP flow performance may be interpreted, collected and analyzed to generate meaningful, real-time assessments, which may allow carriers more efficiently off-load traffic with finer granularity of control while maintaining user quality expectations. The real-time performance metrics may also support comparative analysis that can be used to update policies resident on UEs. Self-balancing behavior and automatic responses to failures, congestion, and other may be also provisioned.

Briefly, 3GPP access includes access technologies defined by 3GPP, e.g., Global System for Mobile Communications (GSM), Universal Mobile Telecommunications System (UMTS), High-Speed Downlink Packet Access (HSDPA), Long Term Evolution (LTE). Non-3GPP access includes access technologies not defined by 3GPP, e.g., WiFi, Worldwide Interoperability for Microwave Access (WiMAX), CDMA2000.

User equipment (UE) 118 may be a user device such as a multi-mode terminal, a mobile device, and/or others. User equipment has features including a processor such as a central processing unit (CPU). User equipments may be enabled to have a number of different network accesses for communications. For example, a cellular telephone may have WiFi, WiMAX and 3G access capabilities; a laptop computer may have WiFi, Internet and 3G access capabilities; other user equipments may have other one or more combinations of available network accesses. A UE 118 may contain a set of pre-provisioned and static inter-system mobility (ISM) policies (Policy A, Policy B, others) 116. ISM policies 116 define UE behavior with respect to single and multi-radio operation. In one aspect, the network may trigger a UE 118 to make active one policy from the set of candidate policies. This trigger can be delivered based on real-time operating conditions, service provider requirements or in response to emerging events such as priority-events, disaster recovery, load-balancing, and/or others.

Additionally, new policies may be instantiated in response to limited-time promotions in partnership with retail establishments or to support location-based gaming scenarios, and/or others. For example, a business (e.g., a coffee shop providing networking capabilities to its customers in the shop) can enter a deal with a network/service provider to support nearby connections at specified dates and times in exchange for branding and advertising opportunities. Another example may involve location-based scavenger hunts such as those being enabled by SCNVGR, a location-based game platform. Here a device may have a new policy "unlocked" if they complete a sequence of game steps by visiting a number of places in a proper sequence. This aspect may focus on enabling network discovery and selection techniques to support mobile/social gaming scenarios.

A Packet data network (PDN) 102 connects the user equipment 118 to data networks. The PDN 102 serves as a gateway to the user equipment 118 for providing routing and accesses to 3GPP and non-3GPP access networks, and may provide and enforce policies. The PDN 102 can support and manage mobility and traffic across various access technologies. In the present disclosure, the PDN 102 functionality may include a filter module or functionality 104, a compare module or functionality 106, and a decision logic module or functionality 108 in providing the dynamic policies and policy updates to the UE 118.

Radio Access Network (RAN) ∩1 120 and RAN #2 represent 122 on-going data flow to the PDN 102. The filter module 104 filters, categorizes, and monitors the data received from the network data from RAN ∩1 120 and/or RAN #2 122. For example, the data may be filtered according to occurring trends in the network and categorized. The filtered data may be stored in a persistent storage 124 for analysis. The filter module 104 may also monitor the real-time activities of the networks (e.g., 120, 122) and assess relative performance. In one embodiment, the monitoring functionality may be implemented with the filter module of the PDN 102. In another embodiment, the monitoring functionality may be a separate component interfaced to the PDN 102. Other implementations are possible for providing such monitoring functionality.

The compare module 106 takes the data processed by the filter module 104 and performs various analyses and assessments. Analyses and assessments may include comparing the flow information of the RANs (e.g., 120, 122), flow performance based on bandwidth, packet loss and others. The output of the comparison may be fed to the decision logic 108.

The decision logic module 108 may include rules and thresholds, and other decision making functionality for determining policy updates. In one embodiment, a service operator may configure rules, thresholds and other decision logic into the policy update system. For example, the operator may set congestion threshold beyond which new policy updates may be delivered. In another aspect, a service provider may manually initiate policy updates. The decision logic module 108 takes into account the subscriber information 110, existing policies 112, and network access load, for example, 3GPP and non-3GPP loading 114, and uses the current network information analyzed and/or assessed by the comparison module 106, which is real time or substantially real time (semi-real time), and determines whether there should be changes in the network policies. For example, the decision logic module 108 may use the subscriber information to determine the type of service a user has, e.g., a premium service or a type of service level agreements (SLAs), and use that information when making a decision and applying a policy. For instance, if a user who has a premium service that guarantees a minimum threshold throughput or response time, that user should be instructed to move to a new RAN if the current flow is degrading with the connected RAN. As another example, if the subscriber is best effort and enjoying more bandwidth, it should be moved to best effort. Similar principles may apply with the network load information, for example, how many UEs are currently active and what is the expected number of UEs that can move within next few minutes. These information can be used for inference to policy updates.

In one embodiment of the present disclosure, the PDN 102, e.g., via the functionalities of the modules 104, 106 and 108, may provide policy "suggestions" to mobile devices, e.g., UE 118. In one embodiment, there may be a set of pre-provisioned policies (A, B, C, and/or others) and based on the dynamic network conditions, operator initiation, and/or other conditions, the network may deliver a message to the UE 118 to switch to a different policy from among the preset ones.

Sets of policies may include those configured for single radio access as well as those configured for multi-radio access. Policies may also contain information for specific mechanisms for dealing with multi-radio access (simultaneous transmission, non-simultaneous transmission, flow-routing, and/or others). The decision to trigger a new active policy with the UE 118 may come from the network and be based on information received for other network elements regarding the level of congestion 114, the local subscriber mix or subscriber information 110, the anticipated application mix, and other policies 112.

In one embodiment, policies 116 may be pre-defined and need not be created on the fly. Updates may indicate which of the pre-defined policies should be instantiated on the UE 118. UEs may be configured with a default policy. The policy update may contain a lifetime value over which the updated policy should be primary, after which the default policy regains primacy. This aspect provides for a notion of time-limited policy dominance. For example, policy updates may indicate which policy is to be dominant. Enhancements to this behavior may include passing a time value or the like, in the policy update that indicates how long the policy indicated in the policy update should be dominant, after which, the policy that dominated just prior to the policy update message would resume its dominance. Policy updates may change the UE's preference for connecting to certain types of accesses.

In another embodiment, the policy updates or updates to the policy 116 may be broadcast or unicast. An operator may be able to broadcast policy updates across a defined geographical region or a defined set of users, for instance, using geofencing or other techniques. Operators may also be able to update individual UE policies, and/or update policies to a group of UEs, for example, connected to the same WiFi access point (AP).

Policies may be addressed to a single UE as well as groups of UEs. The groupings may be based on common attributes, such as location, proximity to one another or sharing of a common base station or access point. Yet in another aspect, operators may also be able to send policy updates to a collection of UEs with the same make or model device. For instance, updates can be applied to devices that share similar characteristics such as make and model. For example, a single policy update can be generated and delivered to all Apple™ iPhone™ 3Gs, for instance, with coordination with the provider's home subscriber server (HSS) and other repositories of subscriber information. This may be achieved by querying HSS to get addresses for subscribers that have the specified hardware. An address structure may be implemented for generating this list quickly and efficiently. For instance, N unicast messages could be delivered, and/or a policy update parameter contained within the policy update message could be used to further refine the addressing scheme, for example, an optional manufacturer or make/model field that could be populated. In this scenario UEs would check to see if they met the criteria specified in the message to determine whether or not the policy update applied to them.

The PDN 102 of the present disclosure may enable network-based control and management of simultaneous connections. PDN 102 may define a network element/function that would actively monitor access links to assess relative performance. PDN 102 may actively manage this connection by providing network-based policy updates to UE 118 to influence UE's multi-access connectivity policies.

Figure 2:
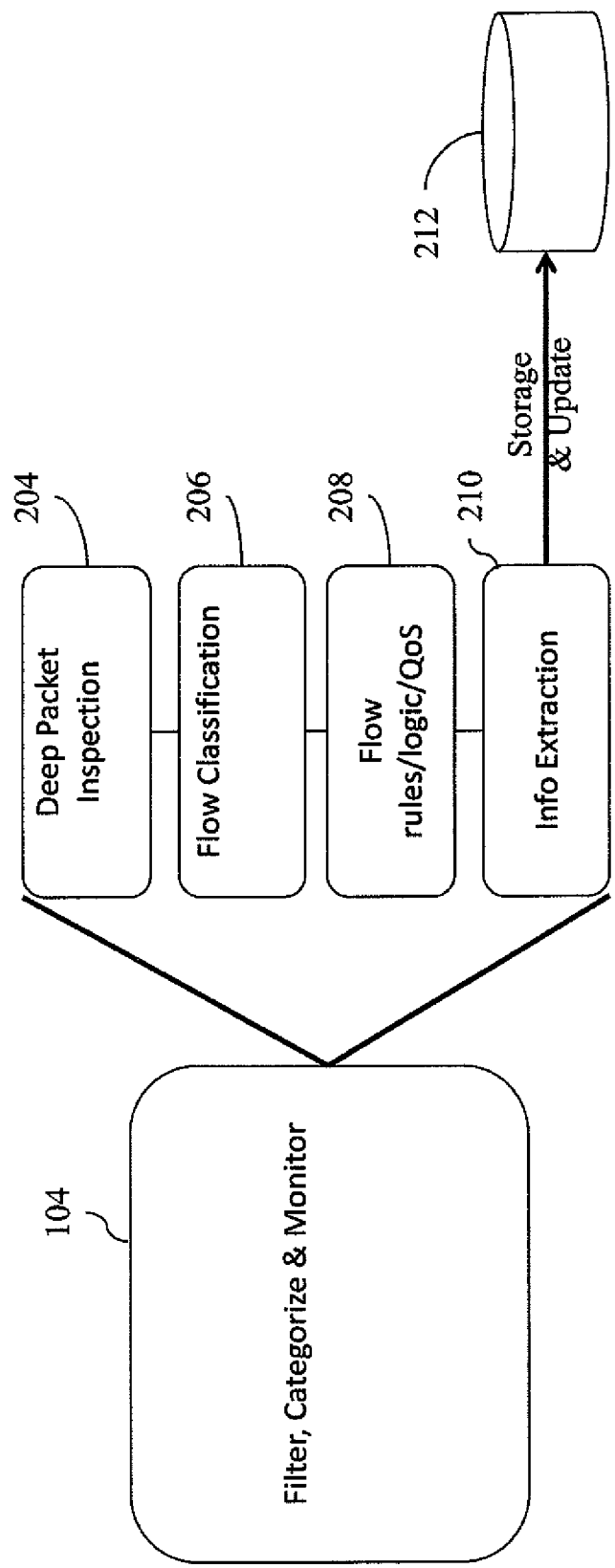
FIG. 2 shows a filter, categorize and monitor function in one embodiment of the present disclosure.

FIG. 2 shows functions filter, categorize and monitor module 104 in one embodiment of the present disclosure. The filter module 104, in one embodiment, may perforin deep packet inspection 204. The deep packet inspection 204 may include examining or evaluating the data packet in the message flow, e.g., the message/protocol header, payload, and/or others. Deep packet inspection 204, for instance, can determine the type of the message, e.g., whether it is streaming video, audio, chat, text, Voice over Internet Protocol (VoIP) and/or other data, the size of the message, and other information pertaining to the data packet. The deep packet inspection can also give information, such as whether they are encrypted, going through VPN tunnel and others. The deep packet inspection can examine data at different levels, e.g., a network level, Medium Access Control (MAC) level and others.

Using the output from the deep packet inspection, the filter module 104 may perform flow classification 206. For instance, flows may be classified or categorized as streaming videos, audios, chat, VoIP, and/or others. Flow may be also classified according to similar traffic, which user, which protocol, as being from the same or similar source, web site, content site, as having normal content or high definition content (e.g., HD video). Other classifications may also be made. Classified flows may be sub-categorized or sub-classified into finer grain categories. For instance, flow classified as having streaming video data can be sub-classed into MPEG, HD, and/or other. Flows can further be categorized in terms of bandwidth usage, similar codec type, media type, and/or others. As example, the classifications can be expressed as n-tuples, e.g., 3 or 4 or 5-tuple expression. An example of a 5-tuple expression would classify a flow as follows: {source IP address, destination IP address, Source port, destination port, type of application or protocol header}. Other expressions of classification are possible. Flow classification also determines the number of items in the categories or classification.

At 208, the filter module 104 may also perform further classification of the network flows according to predefined rules or logic or quality of service (QoS). For instance, flows can be further classified into categories of consuming bandwidth; for example, those using predefined ranges of bandwidth can be classified into different bandwidth range categories. Flows can be classified according to the specified QoS for different users. Additional classification may be performed according to rules and/or logic defined by network operators.

At 210, the filter module 104 may perform information extraction; for example, perform data mining from the classified information to collect information about the current network flow. Examples of the extracted or collected information at 210 may include, but not limited to, which user is sending what type of information to where, how the different types of flows are being communicated in a network, for example, at which time of the day. The extracted information may be stored in a storage device 212, for example, as database of records and/or files, and/or in other form. In another aspect, the extracted information may be sent in real time or semi-real time to compare functionality (FIG. 1, 106) that uses the information to analyze and/or assess the state of network.

Figure 3:
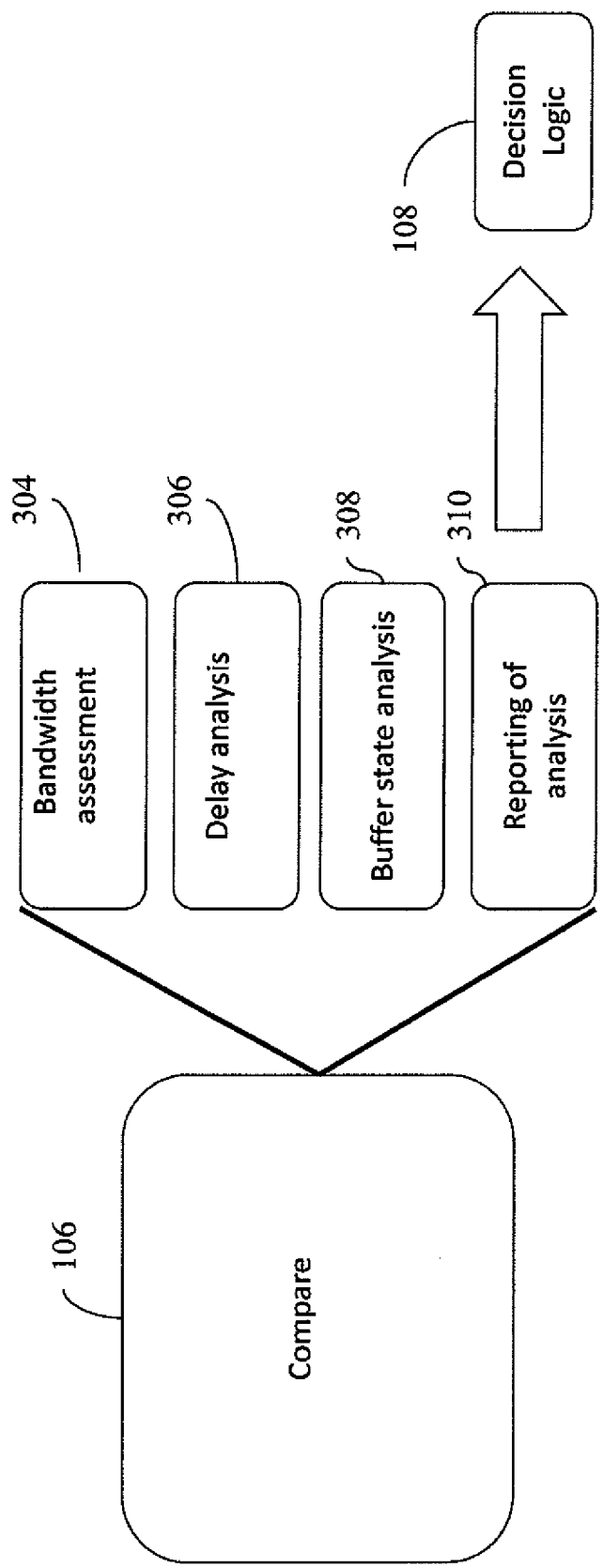
FIG. 3 shows a compare function in one embodiment of the present disclosure.

FIG. 3 shows functions of a compare module 106 in one embodiment of the present disclosure. The compare module 106 of the present disclosure in one embodiment may perform bandwidth assessment 304. For example, using the extracted information about the current network flow, the compare module 106 may determine how much of bandwidth is being used and how much is available. Further, at 306, using the information extracted from the deep packet inspection as described with reference to FIG. 2, the compare module 106 may perform delay analysis, for example, determine what delays there are in entering or in admission to the network, whether there are large number of queues in the network/router, and others. At 308, also using the information extracted from the deep inspection as described with reference to FIG. 2, the compare module 106 may perform buffer state analysis. For instance, the compare module 106 may determine what percentage of buffers at what switches, routers, or other devices or nodes in the network, is available, full or unused.

The compare module 106 may also perform reporting of the analysis at 310, reporting the results of the analysis and/or assessment (e.g., performed at 304, 306 and 308) to a decision logic module 108. The reporting may be performed in real-time or semi-real time, for instance, within few minutes to few hours of the occurring network operating conditions. For instance, the analysis and/or assessment information may be transmitted to the decision logic module 108 in real time, or buffered or stored in memory and/or in persistent storage device for the decision logic module 108 to use.

Figure 4:
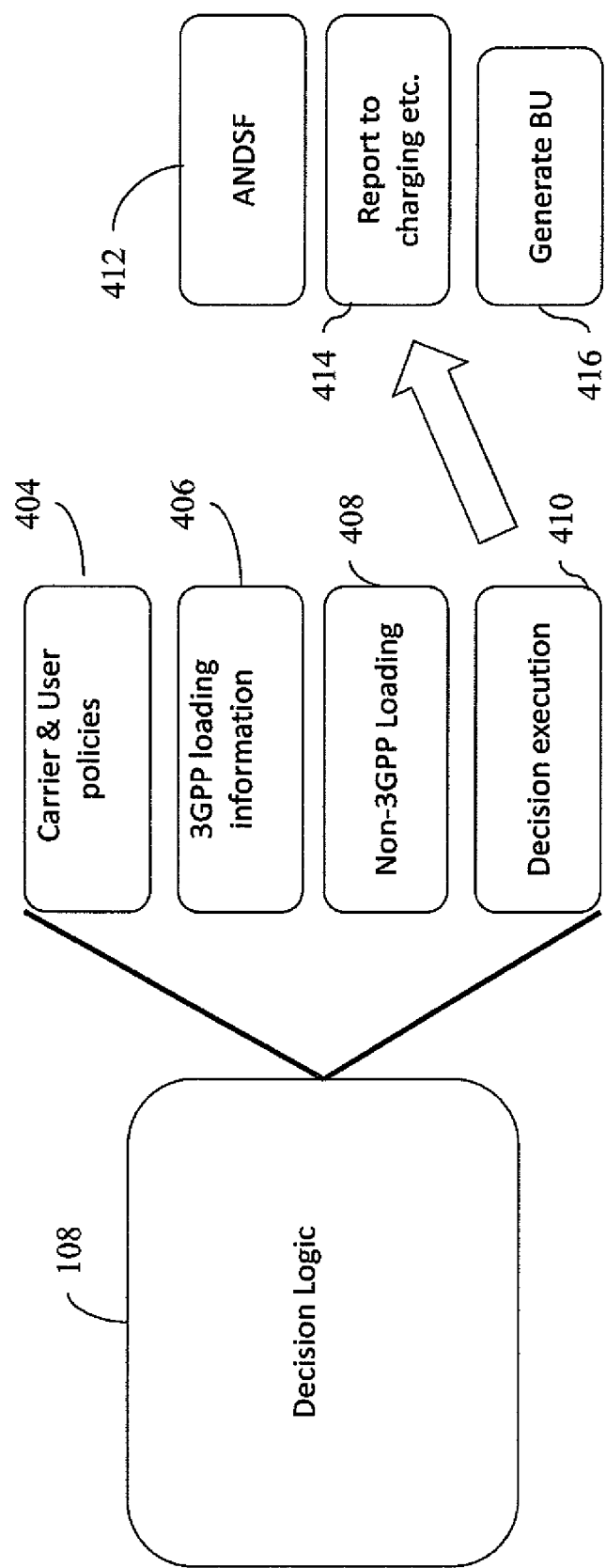
FIG. 4 shows a decision logic module in one embodiment of the present disclosure.

FIG. 4 shows a decision logic module in one embodiment of the present disclosure. The decision logic module 108 may include rules for making decisions as to policy updates.

The decision logic module 108 in one embodiment of the present disclosure may use existing carrier and user policies 404, 3GPP loading information 406, non-3GPP loading information 408, and based on the current network state or behavior as determined by the analysis and/or assessment information received from the compare module 108, generate decisions for execution at 410. Loading information (406, 408) describes how the networks are loaded. User policies 404 describe specific policies pertaining to users, for example, according to user subscription. For instance, based on a user's subscription policy and the current network information, the decision logic module 108 may generate a decision to change the network for this user. The decisions generated by the decision logic module 108 may be also considered as inferences as to what actions should be taken.

The Access Network Discovery and Selection Function (ANDSF) 412 may include data management and control functionality used for providing network discovery and network selection assistance data to the UE according to operators' policy, for example, for WiMAX, WiFi, WLAN access networks, and others. According to 3GPP TS 23.402, the ANDSF shall deliver inter-system mobility policy information. The ANDSF is able to initiate data transfer to the UE based on network triggers, and respond to requests from the UE. The ANDSF is located in the subscriber's home operator network and the information to access it should be either configured on the UE or discovered by other means. In one aspect of the present disclosure, the decision logic 108 may be interfaced to the ANDSF to be updated with real-time conditions and/or context in order to deliver the appropriate ISM policies to a UE. The decision execution 410 may communicate the policy updates with the ANDSF 412 can deliver the updates in accordance with the policies of the decision logic module 108.

In another aspect, the resulting decision determined by the decision logic module 108 may be sent to one or more charging systems or modules 414. The charging systems 414 may use the knowledge or information for charging or billing users dynamically. For instance, users using the network during off-peak hours or during the time with more bandwidth available may be charged less than those who use the network at the time when the available bandwidth is less or during peak hours traffic. Whether a network is busy or not-busy may be determined according to a predetermined threshold. Yet in another aspect, the information from the decision logic module 108 may be used for creating new business update (BU) or generating new revenues as shown at 416.

The methodologies of the present disclosure may provide performance logging, analytics and reporting, as well as insights into consumer behavior/preferences such as percentage of traffic, aggregate performance, and others. For example, with the PDN methodology of the present disclosure, carriers can exercise greater control over service delivery, e.g., contribute to offload and UE management strategy. The methodologies of the present disclosure may also provide better management of available resources, and improve capacity and reduces customer frustration. The methodologies of the present disclosure may provide transparency to external applications and UEs; connectivity strategies, additional decision support and evaluation and improvement to security and reliability.

For instance, flow transparency may include single IP flow from a website offering streaming videos to 3GPP users; Multiple IP accesses may include Long Term Evolution (LTE) and Wi-Fi within provider network; Use of multiple addresses hidden such websites. A new PDN functionality in the present disclosure may manage multiple streams; Manage buffer and packet headers to ensure proper delivery; and Eliminate duplicate packets, assembles composite packet stream.

Multi-access delivery can enhance security by mitigating and responding to cyber-attacks and making 3GPP networks and services more resilient. A non-3GPP access identifier (ID) is an additional dimension on which UEs can be challenged and provide differentiated responses. New Challenge mechanisms that require deliver challenges over one access and require responses over another access. For encryption, coded patterns can be established across multiple accesses to thwart eavesdropping and other malicious inferencing. For resiliency, in the event cyber attack disables one access network, another access network can be used to recover; and include failover in the event of RAN failures, and others.

In yet another aspect, a comparative analysis function may be resident on PDN to provide real-time performance comparisons. Such analysis may trigger IP Flow Mobility process. In another aspect, a routing methodology may allow one IP flow to be delivered most advantageously over multiple accesses simultaneously. Flow inferencing may be performed via deep packet inspection and other flow dynamics. Still yet, active bandwidth probing may be performed from PDN rather than passive measurements. The methodology of the present disclosure may use UE queue lengths across all available IP accesses to assist in decision making, and interface into charging and accounting functions.

Figure 5:
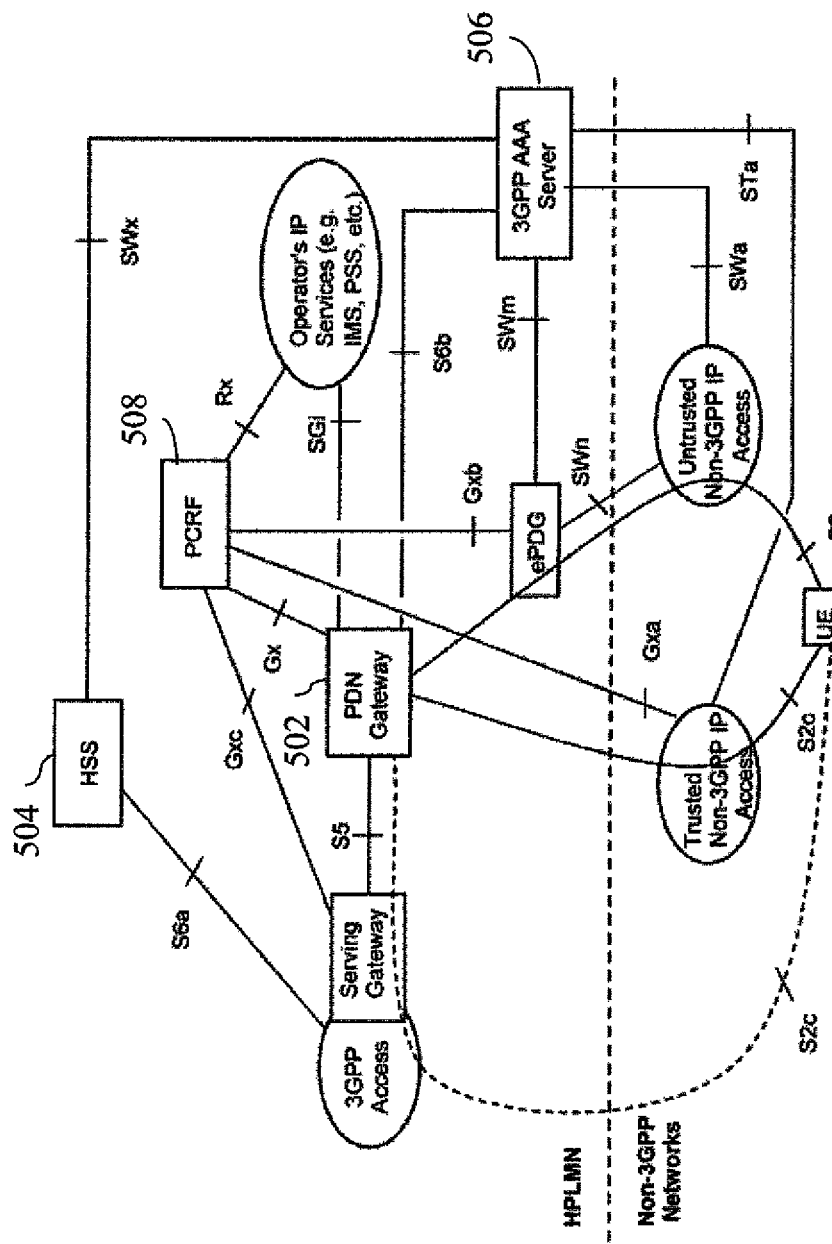
FIG. 5 is an architectural diagram illustrating network environment and devices in which a method of the present disclosure in one embodiment may be implemented.

FIG. 5 is an architectural diagram illustrating network environment and devices in which a method of the present disclosure in one embodiment may be implemented. The architecture shown in FIG. 5 follows the 3GPP technical specification 23.402. The network architecture, for example, may aggregate information to and from the network, operational support systems, and other sources (such as portals) in real time, and support the creation of rules and then automatically make intelligent policy decisions for each subscriber active on the network. Such a network might offer multiple services, quality of service (QoS) levels, and charging rules.

The architecture shows Home Public Land Mobile Network (HPLMN), providing telecommunication service to which a customer (or subscriber belongs to) and non-3GPP networks.

PDN gateway 502, for instance, may be implemented to include the methodologies of the present disclosure in one embodiment. Thus, for instance, the functionalities of the present disclosure may reside in PDN gateway 502.

A Home Subscriber Server (HSS) 504 may include a user database such as the subscription-related information (subscriber profiles), perform authentication and authorization of the user, and can provide information about the subscriber's location and IP information. AAA server 506 may provide for communication with non-3GPP Accesses. Policy and charging rules function (PCRF) 508 may manage policy rules between applications and policy enforcement points like access devices in multimedia network. The PCRF 508 may be a software component that may access subscriber databases and other specialized functions, such as charging systems.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions stored in a computer or machine usable or readable storage medium, which causes the computer or machine to perform the steps of the method when executed on the computer, processor, and/or machine. A computer readable storage medium or device may include any tangible device that can store a computer code or instruction that can be read and executed by a computer or a machine Examples of computer readable storage medium or device may include, but are not limited to, hard disk, diskette, memory devices such as random access memory (RAM), read-only memory (ROM), optical storage device, and other recording or storage media.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for provisioning mobility policy updates for mobile devices, comprising:
   receiving packet network data at a packet data network gateway device;
   classifying the received packet network data to extract information associated with one or more messages in the packet network data;
   analyzing the information to determine current operating conditions of a network; and
   dynamically determining at least one of policy updates, rules, and thresholds based on the analyzing of the information and information associated with subscribers, location, existing policies, and network operating condition and load for assisting network discovery to which user equipment is to be connected.

2. The method of claim 1, further including sending the dynamically determined at least one of policy updates, rules and thresholds to user equipment.

3. The method of claim 1, wherein the dynamically determining includes dynamically determining at least one of policy updates, rules, and thresholds based on the analyzing of the information and information associated with subscribers, location, existing policies, and network operating condition, load and service requirements.

4. The method of claim 1, further including performing deep packet inspection to classify the received packet network data.

5. The method of claim 1, further including storing the classified information for use in the analyzing step.

6. The method of claim 1, wherein the step of analyzing includes at least one of performing bandwidth assessment, delay analysis, and buffer state analysis.

7. The method of claim 1, wherein the network load includes 3GPP and non-3GPP loading information.

8. The method of claim 1, wherein said at least one of policy updates, rules, and thresholds are sent to a charging system for billing policies.

9. A system for provisioning mobility policy updates for mobile devices, comprising:
   a packet network gateway device receiving packet network data and serving as an entry and exit point for the packet network data from one or more user equipments;
   a filter module resident in the packet network gateway device, receiving a flow of the network data and classifying the network data to extract information associated with one or more messages in the packet network data;
   a compare module resident in the packet network gateway device, analyzing the information; and
   a decision logic module resident in the packet network gateway device, determining at least one of policy updates, rules, and thresholds based on the analyzing of the extracted information and information associated with subscribers, existing policies, and network operating conditions and load for assisting network discovery to which user equipment is to be connected.

10. The system of claim 9, further including a storage module for storing the information classified by the filter module, wherein the compare module reads the information from the storage module.

11. The system of claim 9, wherein the classified information is communicated to the compare module in real-time.

12. The system of claim 9, wherein the determined at least one of policy updates, rules and thresholds are dynamically determined and sent to user equipment.

13. The system of claim 9, wherein the filter module is operable to perform deep packet inspection for classifying the network data.

14. The system of claim 9, wherein the compare module is operable to perform at least one of bandwidth assessment, delay analysis, and buffer state analysis.

15. The system of claim 9, wherein the decision logic module further uses data associated with service requirement for dynamically determining at least one of policy updates, rules and thresholds.

16. A computer readable storage medium storing a program of instructions executable by a machine to perform a method of provisioning mobility policy updates for mobile devices, comprising:
receiving packet network data at a packet data network gateway device;
classifying the received packet network data to extract information associated with one or more messages in the packet network data;
analyzing the information to determine current operating conditions of a network; and
dynamically determining at least one of policy updates, rules, and thresholds based on the analyzing of the information and information associated with subscribers, location, existing policies, and network operating condition and load for assisting network discovery to which user equipment is to be connected.

17. The computer readable storage medium of claim 16, further including sending the dynamically determined at least one of policy updates, rules and thresholds to user equipment.

18. The computer readable storage medium of claim 16, wherein the dynamically determining includes dynamically determining at least one of policy updates, rules, and thresholds based on the analyzing of the information and information associated with subscribers, existing policies, and network load and service requirements.

19. The computer readable storage medium of claim 16, further including performing deep packet inspection to classify the received packet network data.

20. The computer readable storage medium of claim 16, further including storing the classified information for use in the analyzing step.

21. The computer readable storage medium of claim 16, wherein the step of analyzing includes at least one of performing bandwidth assessment, delay analysis, and buffer state analysis.

22. The computer readable storage medium of claim 16, wherein the network load includes 3GPP and non-3GPP loading information.

23. The computer readable storage medium of claim 16, wherein said at least one of policy updates, rules, and thresholds are sent to a charging system for billing policies.

* * * * *

UNITED STATES PATENT AND TRADEMARK OFFICE
CERTIFICATE OF CORRECTION

PATENT NO. : 8,681,648 B2  
APPLICATION NO. : 13/069881  
DATED : March 25, 2014  
INVENTOR(S) : Famolari et al.

Page 1 of 1

It is certified that error appears in the above-identified patent and that said Letters Patent is hereby corrected as shown below:

In the Specification

In Column 3, Line 63, delete "(RAN) ∩1 120" and insert -- (RAN) #1 120 --, therefor.

In Column 3, Line 66, delete "(RAN) ∩1 120" and insert -- (RAN) #1 120 --, therefor.

In Column 5, Line 54, delete "perforin" and insert -- perform --, therefor.

In Column 7, Line 16, delete "compare module 108," and insert -- compare module 106, --, therefor.

In Column 9, Line 44, delete "machine Examples" and insert -- machine. Examples --, therefor.

Signed and Sealed this  
Fourteenth Day of April, 2015

Michelle K. Lee  
*Director of the United States Patent and Trademark Office*